Nov. 12, 1968  C. A. POUX  3,409,941
APPARATUS FOR PRODUCING PLASTIC ARTICLES
Filed Sept. 6, 1966  2 Sheets-Sheet 1
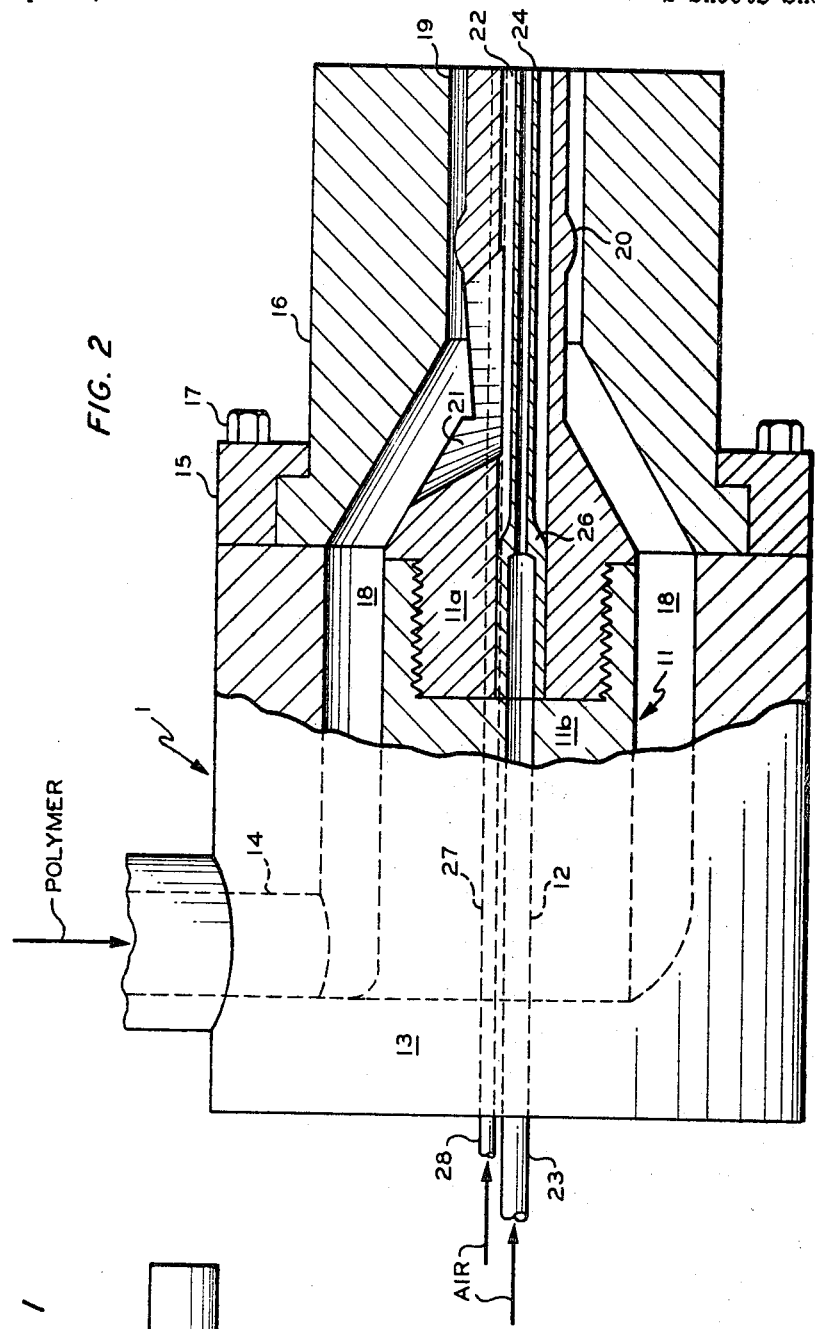
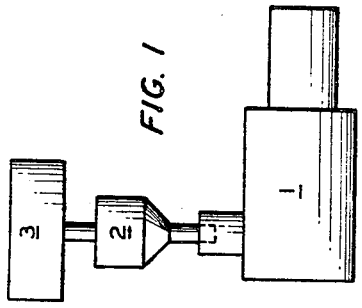
INVENTOR
C. A. POUX
BY
ATTORNEYS Nov. 12, 1968 C. A. POUX 3,409,941
APPARATUS FOR PRODUCING PLASTIC ARTICLES
Filed Sept. 6, 1966 2 Sheets-Sheet 2

United States Patent Office 3,409,941
Patented Nov. 12, 1968

3,409,941
APPARATUS FOR PRODUCING
PLASTIC ARTICLES
Charles A. Poux, Titusville, Pa., assignor to Phillips
Petroleum Company, a corporation of Delaware
Filed Sept. 6, 1966, Ser. No. 577,454
5 Claims. (Cl. 18—14)

ABSTRACT OF THE DISCLOSURE

Apparatus for producing a first tubular extrudate disposed within a second tubular extrudate in a single operation by means of a die having a first annular extrudate passageway formed by a first mandrel and bore through the die, a second annular extrudate passageway formed by a second bore and mandrel located within said first mandrel, and connected to said first annular passageway by means defining an opening in said first mandrel to form a communicating passageway between said first and second annular passageways.

---

This invention relates to plastic articles and apparatus for producing them. In one aspect this invention relates to apparatus for extruding plastic articles. In another aspect this invention relates to an apparatus for extruding a first extrudate within a second extrudate.

In the production of plastic articles, such as a pipe within a pipe, difficulty has been encountered as to controlling the desired thickness of the two pipes. Die structures proposed for such dual extrusion have been rather complicated and have not provided means for establishing and maintaining controlled thickness of articles extruded using dual extrusion chambers.

An object of my invention is to provide an apparatus for extruding a first extrudate within a second extrudate.

Another object of my invention is to provide means for establishing and maintaining controlled thickness of articles extruded using dual extrusion chambers.

Further aspects, objects and advantages of my invention will be apparent to one skilled in the art from a study of the written description, the drawing, and the claims.

According to my invention I have provided a die for extruding plastic material wherein a restriction is positioned within a first passageway formed by a mandrel, and a die bushing of the die to restrict the flow of plastic material through the first passageway and force a portion of the plastic material through an opening in the mandrel upstream of the restriction into a second passageway in the mandrel.

Further according to my invention I have provided an apparatus for producing a plastic article comprising a first extrudate disposed within a second extrudate by means of a die assembly having a first mandrel which serves as a second die, said second die having a second mandrel which is supplied with thermoplastic material through an opening in the wall of said first mandrel so as to produce an extrudate from both first and second dies, and a die bushing attached to said first die head and positioned around said first mandrel such that the inner surface of the bushing defines a first passage with the outer surface of said first mandrel so as to allow the thermoplastic material to flow therethrough. A section of the outer surface of said mandrel is provided with a restrictive means so as to reduce the flow of thermoplastic material therethrough, thus forcing a portion of said thermoplastic material through an opening in said first mandrel to said second die located within said first mandrel. Such restrictive means establishes equilibrium between the two dies, thus allowing extrudates of uniform thickness to be formed. Separate extrudates are extruded, one within the other. When the inner extrudate is allowed to contact the inner surface of the second extrudate while both are in a molten state, an extrudate within an extrudate firmly bonded together is formed. Fluid is passed through the first and second extrudate to prevent collapse of the extrudate while being bonded together in a molten state.

In the drawing, FIGURE 1 is a schematic representation of an apparatus employed in producing a plastic article according to my invention.

FIGURE 2 is a partial cross-section of the die assembly of FIGURE 1.

Figure 4:
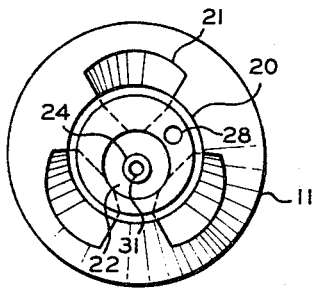
FIGURE 4 is an end view of the mandrel of FIGURE 2 and FIGURE 3.

In FIGURE 1, the apparatus for producing a plastic product comprising a first extrudate disposed within a second extrudate and bonded together in a longitudinal manner includes a die assembly, referred to generally by reference numeral 1, and an extruder 2 positioned to receive polymeric material in the form of granules or the like from a storage hopper 3. Extruder 2 plasticizes the polymeric material into a molten mass which is passed to die assembly 1.

Referring more particularly to FIGURE 2 of the drawing, the die assembly 1 includes a tapered mandrel 11 having a bore 12 therethrough, a diehead 13 having an opening 14 and a die bushing 16 attached to diehead 13 by flange 15 which is attached to diehead 13 by bolts 17. Diehead 13 and die bushing 16 are positioned around mandrel 11 so their inner surfaces define a passage 18 with the outer surface of mandrel 11. Passage 18 is in communication with opening 14 in diehead 13 so that molten polymer can be delivered from the plasticizing means (not shown) to the die.

Mandrel 11 comprises a threaded male section 11a which cooperates with a corresponding threaded female section 11b. As indicated in the drawing, diehead 13 and bushing 16 and female and male sections 11a and 11b of mandrel 11 are in register to provide passage 18 in the die assembly and an annulus 19 where the molten plastic material is passed. An opening 21 in male section 11a is provided to allow a portion of the plastic material to enter into annulus 22 formed within male section 11a of mandrel 11. An annular projection 20 is positioned on the exterior surface of male section 11a of mandrel 11 to control the flow of molten plastic material in passage 18 and to create a back pressure in said passage, to distribute the flow of plastic material between annulus 19 and annulus 22. Male section 11a of mandrel 11 is tapered to assist the guiding of plastic material through opening 21 into annulus 22.

Bore 12 passing through diehead 13 and mandrel 11 is aligned to form a continuous opening throughout the die. Conduit means 23 is inserted within said opening which serves as a second mandrel 24 of a second die 26 located within male section 11a of mandrel 11. A second bore 27 passing through diehead 13 and mandrel 11 is aligned to form a continuous opening through the die. A second conduit means 28 extends also throughout diehead 13 and mandrel 11 to provide pressure within the extrudate formed by passage through annulus 19.

Figure 3:
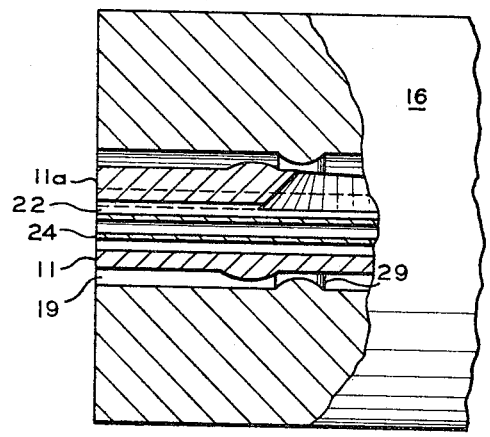
FIGURE 3 is a partial cross-section of a modified die assembly.

In FIGURE 3 a second annular projection 29 is positioned on the interior surface of die bushing 16 so as to better control the flow of polymeric material through annulus 19, thus maintaining controlled thickness of the extrudate formed by polymeric material flowing through annulus 19 and annulus 22.

In operation, the amount of polymeric material passing from passage 18 to annulus 19 by way of projections 20 and 29 may be regulated by adjusting male section 11a in relation to female section 11b of mandrel 11, such as by screw or like means.

Mandrel 24 is shown positioned within mandrel 11 in an off-center relation to the center of mandrel 11. This is desirable to minimize variation in the area wherein the first extrudate disposed within the second extrudate is longitudinally bonded to the outside surface of the first extrudate and the inside surface of the second extrudate.

Fluid, e.g., air, passed through conduit 28 cools the outer tube while maintaining a pressure within the tube to prevent its collapse. Similarly, fluid passed through conduit 23 maintains a pressure within the inner tube to prevent its collapse and also to cool said inner tube.

In FIGURE 4, the mandrel depicted in FIGURES 2 and 3 is shown in a view wherein the narrow extrudate end of the mandrel 11 faces the viewer, and mandrel 11 has been removed from the die bushing 16 and the die-head 13. The referenced numerals in FIGURE 4 correspond to the features illustrated by the corresponding numerals in FIGURES 2 and 3, with the exception that the opening 31 defined by the second mandrel 24 is the extrudate end of conduit 23.

EXAMPLE

In an example, according to my invention, plastic pellets of polyethylene, having a nominal density of 0.92 g./cc. and a melt index of 2.5 (ASTM D–1238, Condition E), were fed to an extruder wherein they were reduced to a molten state and then introduced into the die of FIGURE 2. A 2½-inch electrically heated extruder with a 15:1 L/D ratio was used. It was equipped with a constant pitch screw having a 2:1 compression ratio, and run at approximately 10 r.p.m., thus providing a residence time of about 2 minutes. A temperature profile ranging from about 275° F. on the rear cylinder section of the extruder to about 320° F. at the die was used during the extrusion. Cooling water was cascaded on the tubing at the proper point after leaving the die and then the tubing traveled through a water bath for final cooling. The larger tube had an inside diameter of about ¼-inch and the inside diameter of the inner tube was about 1/16-inch. Both tubes had walls about 3/64-inch in thickness.

As the molten plastic material passed through the die, it was fed into two passages. Three openings were provided in a first mandrel so as to allow the plastic material to flow into a second passage surrounding a second mandrel. A restriction such as an annular projection was provided on the exterior surface of a first mandrel so as to reduce the flow of the plastic material in the first passage and to cause a backflow of the plastic material, thus assisting in forcing a portion of the plastic material into the three openings in the first mandrel. The three openings were slots having the dimensions of ½″ x 3/32″.

In this operation, two tubes are extruded, one within the other. The inner tube is extruded over a mandrel which is off center of the first mandrel. As the two tubes are extruded horizontally, the inner tube contacts the outer tube, thus fusing the two tubes together in a narrow area, thus providing an opening within the outer tube. Air lines were provided within the two mandrels to prevent sagging or collapsing of the two tubes. Alternately, the large tube is drawn down to contact the inner tube while both are molten just after leaving the die and in the area of the cascading cooling water.

Cooling and shaping of the outer tube may also be achieved by the use of sizing plates or cooling sleeves or by the use of easily vaporizable liquids, mixtures of coolants, or inert gases.

While projections 20 and 29 have been shown only in annulus 19 to regulate the flow of polymeric material through annulus 19, it is evident that similar restrictions can be employed within annulus 22. Restriction can be used in both, or either, annulus 19 and 22.

Reasonable variations and modifications of the invention are possible without departing from the spirit of the invention. For example, it is obvious that various shapes of the extrudate passageways may be utilized to produce a first extrudate within a second extrudate without departing from the scope of the invention by altering the shapes of the two mandrels.

I claim:
1. A die assembly for extruding a first extrudate within a second extrudate comprising a die body, an elongated first mandrel positioned within said die body to form a first annular extrudate passageway, means for transmitting molten extrudatable material into said first passageway, said first mandrel having a longitudinal tubular passage therein, a second mandrel maintained within said passage and defining a second annular extrudate passageway therewith, said second annular extrudate passageway being concentrically and internally disposed with respect to said first extrudate passageway, means defining at least one opening in the central portion of said first mandrel which forms a communicating passageway between said first extrudate passageway and said second extrudate passageway, and means positioned within said first passageway intermediate said opening and the outer end of said passageway to restrict the flow of said material through said first passageway thereby causing uniform flow of said material into said opening.

2. An assembly according to claim 1 wherein the said second annular passageway is eccentrically and internally disposed with respect to said first annular passageway.

3. An assembly according to claim 1 wherein the restrictive means is an annular projection which projects inwardly from the outer surface of said first mandrel into said first annular passageway perpendicular to the longitudinal axis of said mandrel thereby causing said molten material to uniformly flow from said first passageway to said second passageway by way of said opening, said annular projection being positioned in said passageway immediately adjacent to and upstream from the downstream edge of said opening.

4. An apparatus according to claim 3 wherein the restriction means also includes a second annular projection which projects inwardly from the inner surface of said die body into said first passageway perpendicular to the longitudinal axis of said first mandrel, said second annular projection being positioned immediately adjacent to said first annular projection.

5. An apparatus according to claim 1 wherein said first mandrel consists of an elongated female section and a threaded male section, said male section having a downwardly tapering portion, and an elongated longitudinal portion, and wherein said opening within said first mandrel is provided on the tapered portion of said mandrel to provide said communicating passageway into said second extrudate passageway, said threaded male section being adjustable with said female section to regulate the flow of said material into said first and second extrudate passageways.

References Cited

UNITED STATES PATENTS

| 2,161,666 | 6/1939 | Cowen | 18—14 |
| 2,834,054 | 5/1958 | Maddock et al. | 18—14 |
| 2,859,476 | 11/1958 | Lainson | 18—14 |
| 2,957,201 | 10/1960 | Fields et al. | 18—14 |
| 3,221,372 | 12/1965 | Lieberman | 18—14 |

FOREIGN PATENTS 994,567   6/1965   Great Britain.

WILLIAM J. STEPHENSON, *Primary Examiner.*